United States Patent [19]

Shaland

[11] Patent Number: 5,091,695

[45] Date of Patent: Feb. 25, 1992

[54] ELECTRONIC METER FOR DETERMINING ENGINE SPEED IN DISTRIBUTORLESS IGNITION SYSTEM ENGINES AND CONVENTIONAL FOUR STROKE ENGINES

[75] Inventor: Alexander Shaland, Lyndhurst, Ohio

[73] Assignee: Actron Manufacturing Co., Cleveland, Ohio

[21] Appl. No.: 591,069

[22] Filed: Oct. 1, 1990

[51] Int. Cl.⁵ .............................................. G01P 3/54
[52] U.S. Cl. ................................................. 324/170
[58] Field of Search ........................ 324/168, 169, 170

[56] References Cited

U.S. PATENT DOCUMENTS

| | | |
|---|---|---|
| 3,789,658 | 2/1974 | Olsen . |
| 4,101,822 | 7/1978 | Does et al. . |
| 4,644,284 | 2/1987 | Friedline et al. . |
| 4,687,991 | 8/1987 | Kruncos ............................ 324/169 |
| 4,795,979 | 1/1989 | Kreft et al. . |
| 4,847,563 | 7/1989 | Sniegowski et al. . |
| 4,937,527 | 6/1990 | Sniegowski et al. . |

OTHER PUBLICATIONS

Radio Electronics, vol. 56, Jul., 1985, pp. 55–57, 82.
The Giant Book of Easy to Build Electronic Projects (Tab Books, Inc., 1981).
Kal-Equip Catalog, pp. 3–4, Apr., 1990.

Primary Examiner—Walter E. Snow
Attorney, Agent, or Firm—Calfee, Halter & Griswold

[57] ABSTRACT

An electronic meter for testing engine parameters includes a slide switch and related circuitry for detecting, scaling and displaying the correct value of engine speed for both a conventional four stroke engine and a DIS four stroke engine, as well as for a two stroke engine. The electronic meter has a pickup which is adapted to be placed around a lead from a spark plug in the engine. The electronic meter is adapted to be triggered when a current spike in the spark plug lead is above a selected threshold value. When the electronic meter is triggered, a voltage pulse is stored in an integrating circuit in the meter. The electronic meter scales the voltage across the integrating circuit, measures the scaled voltage, and displays the value on the meter. The slide switch and associated circuitry for the electronic meter are adapted to vary the threshold level for the trigger, as well as appropirately reduce the output voltage of the integrating circuit, depending on the type of engine being tested. When the slide switch is in a first position, the electronic meter displays the correct value of engine speed for a conventional four stroke engine. Alternatively, when the selector switch is in a second position, the meter displays the correct value of engine speed for a DIS four stroke engine or for a two stroke engine.

13 Claims, 2 Drawing Sheets

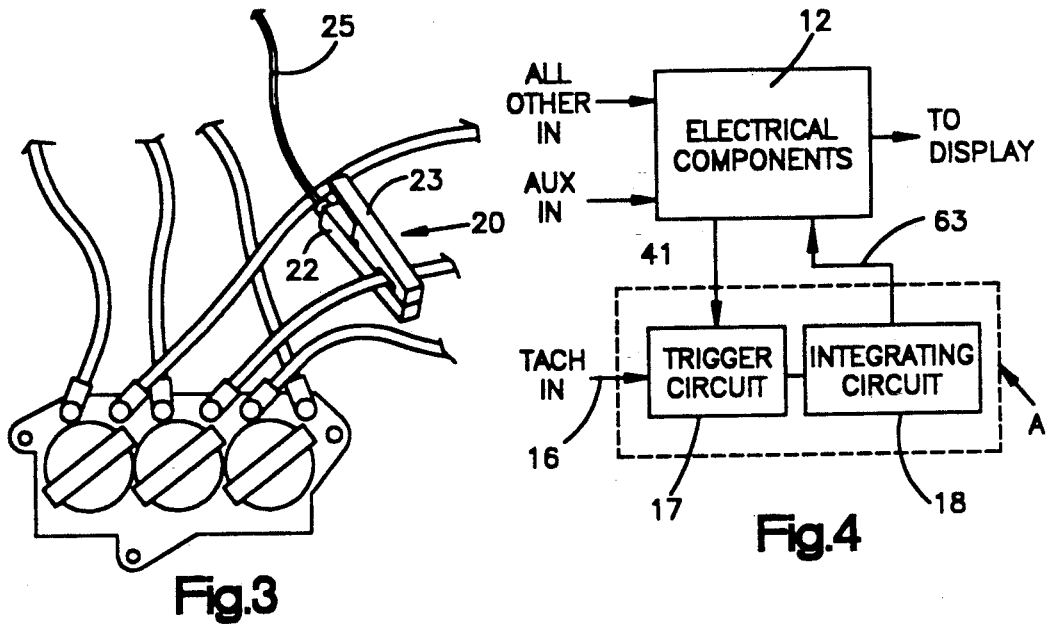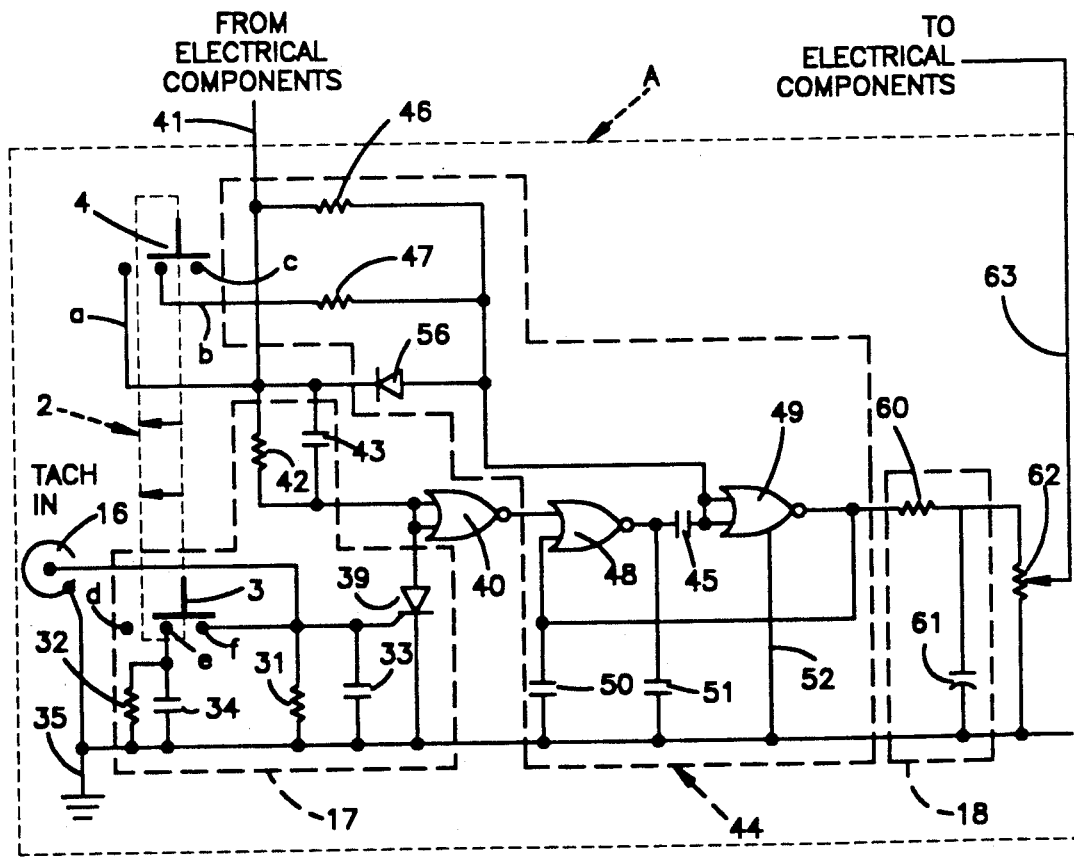

ELECTRONIC METER FOR DETERMINING ENGINE SPEED IN DISTRIBUTORLESS IGNITION SYSTEM ENGINES AND CONVENTIONAL FOUR STROKE ENGINES

DISCLOSURE OF THE INVENTION

The present invention relates to an electronic meter for testing engine parameters. More particularly, the invention relates to an electronic meter having a slide switch and related circuitry that provide for detecting, scaling and displaying the proper value of engine speed for both a conventional four stroke engine, a DIS four stroke engine, and a two stroke engine.

BACKGROUND

Portable electronic meters are typically used to test vehicle engine parameters. An electronic meter may comprise a simple hand held tachometer with a display for showing the engine speed, or may comprise a more elaborate multimeter or computer console, capable of displaying additional engine parameters such as dwell angle, resistance, and voltage levels. A typical digital multimeter, for example, is found in the Model 2880 multimeter produced by KAL Equip Company of Cleveland, Ohio. A typical digital multimeter, including the Model 2880, includes a series of input jacks, a multiple position rotary switch, and a display. Additionally, multimeters can have power leads adapted to supply power to the meter from the vehicle's battery.

When the engine speed is being tested with a multimeter, a pickup for the multimeter is positioned around a spark plug lead. The pickup is adapted to inductively measure the current flowing through the lead. The changing current in the lead, for example when the spark plug is ignited, produces a changing magnetic field. The changing magnetic field in turn produces a changing current, manifested as a current "spike", in the inductive pickup. The inductive pickup applies the current spike to the multimeter through one of the input jacks in the meter. If the current spike is above a selected threshold value, the meter applies a selected duration voltage pulse to a conventional RC integrating circuit. The meter then scales, measures and displays the voltage across the integrating circuit as a value of engine speed (in revolutions per minute or "RPM").

The rotary switch of the multimeter is adapted to be selectively positioned. When engine speed is being tested, the rotary switch is typically set to a "tachometer" position. The rotary switch is in registering relationship with electrical components in the multimeter to properly scale and display the engine parameters on the meter.

A multimeter is typically designed to measure the engine parameters of an internal combustion engine. An internal combustion engine comprises either a two or four stroke engine. A two stroke engine is typically found in smaller engines, such as outboard motors, chain saws and lawn mowers, while a four stroke engine is typically found in larger engines, such as automobiles and trucks. Moreover, a four stroke engine can either have a conventional distributor-type ignition system, or can have a newer distributorless ignition system ("DIS"), which is typically found in late model cars and is electronically controlled by an on-board computer.

A two stroke engine requires two strokes of the piston within the cylinder to complete the operating cycle of the engine. For example, a two stroke engine typically has intake and exhaust port openings on the side of the cylinder in the crankcase. The piston alternately opens and closes the openings as the piston moves within the cylinder.

In a typical two stroke engine, the piston initially moves towards the upper end of the cylinder and creates a pressure drop in the crankcase. The pressure drop in the crankcase creates a flow of fuel and air from the carburetor into the crankcase cavity through a one-way reed valve. As the piston begins to move toward the bottom of the cylinder, during the "power" stroke, the valve closes, thereby trapping and compressing the air-fuel mixture in the crankcase. As the piston continues to move to the bottom of the cylinder, a fuel intake bypass port is uncovered in the cylinder, and the compressed fuel-air mixture flows from the crankcase into the combustion chamber of the cylinder.

As the piston again starts its upward, "compression" stroke, the piston covers the bypass port and compresses the fuel-air mixture in the compression chamber. When the piston nears the top of the compression stroke, the compressed mixture is ignited by a spark across the gap of the spark plug. The spark is caused by an ignition coil which creates a voltage drop across the spark plug gap. The rapid burning of the fuel forces the piston towards the rear of the cylinder on the power stroke. When the piston reaches the bottom of the power stroke, an exhaust port opening is uncovered, slightly ahead of the fuel intake port opening. The exhaust gas, which is still under a slight pressure, escapes through the exhaust port opening, and is assisted by the incoming fuel-air mixture as the fuel intake port opening is uncovered by the piston.

Alternatively, both a conventional and DIS four stroke engine require four strokes of the piston to complete the operating cycle of the engine. A four stroke engine has (1) an intake stroke, (2) a compression stroke, (3) a power stroke, and (4) an exhaust stroke.

On the intake stroke of both the conventional and DIS four stroke engine, the piston moves toward the bottom of the cylinder and creates a vacuum above it in the head of the cylinder. A camshaft mechanically coupled to the crankshaft causes an intake valve in the head of the cylinder to open, and an exhaust valve to close. The intake valve delivers a fuel-air mixture to the cylinder. When the piston begins to move upward in the cylinder during the compression stroke, the intake valve closes and the air-fuel mixture is compressed. When the piston nears the top of the compression stroke, the spark plug fires and ignites the fuel mixture. The rapid burning of the fuel forces the piston downward during the power stroke. At the bottom of the power stroke, the exhaust port opens and the exhaust gas flows out the port, assisted by the upwardly moving piston during the exhaust stroke. Additionally, in a DIS four stroke engine, the spark plug fires a "waste spark" during the exhaust stroke, the relevance of which will be described herein in more detail.

The crankshaft, which is mechanically attached to the end of the piston, rotates once each time the piston reciprocates within the cylinder. The crankshaft is adapted to be mechanically coupled to the vehicle axle to provide power for moving the vehicle.

As described above, the spark plugs in a two stroke engine and a conventional four stroke engine fire only during the power stroke. Therefore, since the piston in the two stroke engine has only two strokes per cycle (a power stroke and a compression stroke), the spark plugs in the two stroke engine fire each time the piston moves to the upward end of the cylinder. In a conventional four stroke engine, the engine has four strokes per cycle (an intake stroke, a compression stroke, a power stroke and an exhaust stroke), therefore, the spark plugs in a conventional four stroke engine fire once every other time the piston moves to the upper end of the cylinder. However, in a DIS four stroke engine, although the engine has the same general cylinder structure as a conventional four stroke engine, the spark plugs fire each time the piston moves to the upper end of the cylinder, which emulates more the engine diagnostics of the two stroke engine rather than the engine diagnostics of a conventional four stroke engine, as will be described herein in more detail.

A DIS four stroke engine has a series of double ended coils which each fire two spark plugs, each in their own separate cylinders, simultaneously. Each coil is coupled through an ignition module to a timing circuit, which is included within an on-board computer. The first spark plug on the coil fires normally in a first cylinder that is on a compression stroke and ignites the air/fuel mixture, while the second spark plug fires a "waste spark" in a second cylinder that is on an exhaust stroke, so named because the spark does not ignite an air/fuel mixture. Consequently, the DIS four stroke engine emulates the two stroke engine because the spark plugs fire each time the piston moves to the forward end of the cylinder.

Moreover, the ignition system of the DIS four stroke engine is more efficient than a conventional four stroke engine. The amplitude and duration of the current in the primary windings of the ignition coils are closely controlled in the DIS four stroke engines. Accordingly, after the spark plugs are ignited, the current flowing through the spark plug leads in the DIS four stroke engine is reduced, and there is a corresponding reduction in "noise" in the spark plug leads caused by other cylinders.

Conventional electronic meters are designed to measure the engine speed for either a two stroke or conventional four stroke engine. For example, the pickup for a two stroke electronic meter is placed around one of the spark plug leads on the two stroke engine and an appropriate value of engine speed is displayed on the meter. However, if the pickup for a meter designed for a two stroke engine is placed around the spark plug lead for a four stroke engine, the meter will display an engine speed which is half the appropriate value, since the spark plugs on a four stroke engine are being fired at half the rate of the spark plugs on a two stroke engine. Similarly, an electronic meter designed for a four stroke engine will display twice the value of engine speed for a two stroke engine.

Moreover, if a DIS four stroke engine is measured using a conventional four stroke electronic meter, the meter will display twice the appropriate value of engine speed, since, similar to the two stroke engine, the spark plugs in the DIS four stroke engine are firing twice as rapidly as a conventional four stroke engine. For service personnel testing engine diagnostics on cars and trucks, and in particular the engine speed, it is therefore necessary to use either a meter designed for a two stroke engine on the DIS four stroke engine, or to manually divide in half the constantly fluctuating engine speed displayed on a conventional four stroke electronic meter, to arrive at the proper engine speed value.

It is known in the art to provide an electronic meter with a switch that allows the meter to properly scale and display the engine speed of both a conventional four stroke or two stroke engine. Such a meter is manufactured by Actron, Model No. ET915. The meter essentially divides the engine speed in half before displaying the value on the meter. However, since the current levels in the spark plug leads for a DIS four stroke engines are less than the current levels for a conventional four stroke engine, electronic meters designed for a conventional four stroke engine can in some instances provide erroneous readings as to engine speed for a DIS four stroke engine. The error results primarily because the threshold current levels for triggering a conventional four stroke meter can be higher than the maximum current level in a DIS four stroke engine.

SUMMARY OF THE INVENTION

The present invention provides a new construction for an electronic meter which provides a slider switch and associated circuitry to select, determine, scale and display the engine characteristics for either a conventional four stroke engine or a DIS four stroke engine, so that an accurate and instantaneous display of the engine speed for a conventional or DIS four stroke engine will be displayed on the meter.

According to one aspect of the invention, the electronic meter comprises a multimeter which includes an inductive pickup, a rotary switch, and a display for displaying the appropriate engine speed for the engine.

The pickup for the multimeter is attached to a spark plug lead in the engine. When the current level in the lead is above a selected value, a one shot multivibrator is triggered and a voltage pulse is stored on an integrating circuit in the meter. The multimeter scales the voltage across the integrating circuit and measures and displays that value on the meter.

The multimeter includes a two position selector switch which allows the multimeter to display the correct value of engine speed for a DIS four stroke engine or a conventional four stroke engine. When the selector switch is set to a first position, the "DIS" position, the multimeter increases the sensitivity of the meter by lowering the threshold level of the meter trigger. The multimeter is thereby triggered by the lower current spikes in the spark plug leads for a DIS four stroke engine. In the DIS position, the meter and associated circuitry are also adapted to divide in half the value of engine speed before scaling and displaying the value on the meter.

When the selector switch is set to the four stroke position, the trigger level for the meter is increased, which compensates for any "noise", or extraneous current spikes on the spark plug leads caused by other cylinders. The meter is thereby triggered only by the larger current spikes caused by spark plug ignition. The meter then scales and displays the value of engine speed on the meter.

Further features and advantages of the present invention will become apparent from the following detailed description and the accompanying drawings.

BRIEF DESCRIPTION OF THE DRAWINGS

FIG. 3 is a schematic illustration of an internal combustion engine with portions omitted illustrating a pickup applied to a spark plug lead from an ignition coil;

FIG. 4 is a schematic illustration of the components of an electronic meter made in accordance with the present invention;

FIG. 6 is an electrical circuit diagram of the circuitry of the slide switch made in accordance with the present invention.

DETAILED DESCRIPTION OF THE PREFERRED EMBODIMENT

Figure 1:
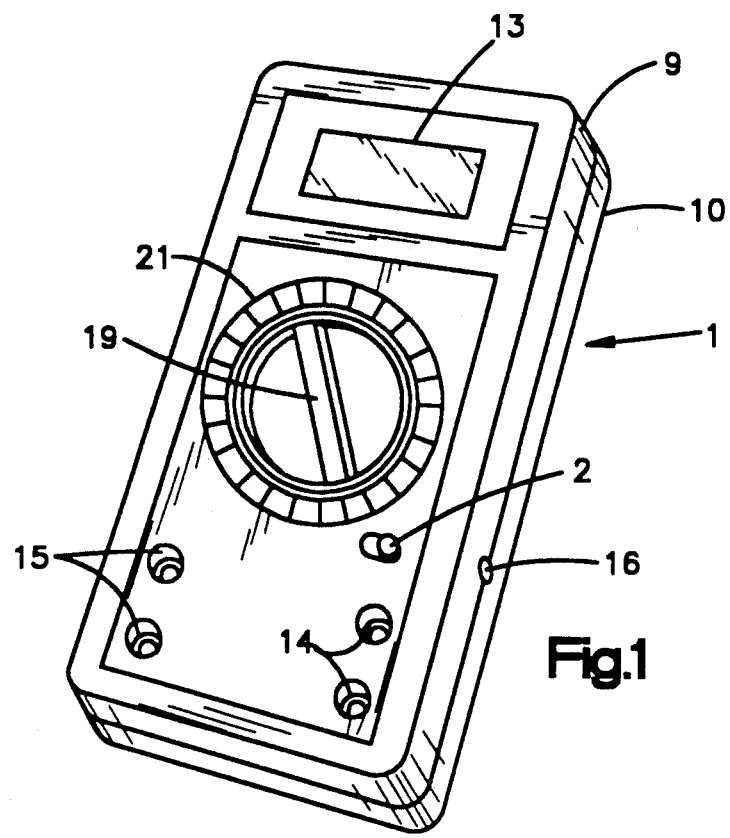
FIG. 1 is a perspective view of a switch made in accordance with the present invention mounted within a schematically illustrated electronic meter.

Referring to the drawings, and initially to FIG. 1, there is illustrated an electronic meter, indicated generally at 1, having a slide switch 2, constructed in accordance with the present invention. The electronic meter may comprise any one of a variety of devices for automotive testing including, for example, what is commonly referred to as a multimeter, a particularly useful device being multimeter Model 2880 as described previously. The slide switch 2, and associated circuitry as herein described, allow the multimeter to display accurate engine parameters for either a conventional four stroke or a DIS four stroke engine.

Figure 2:
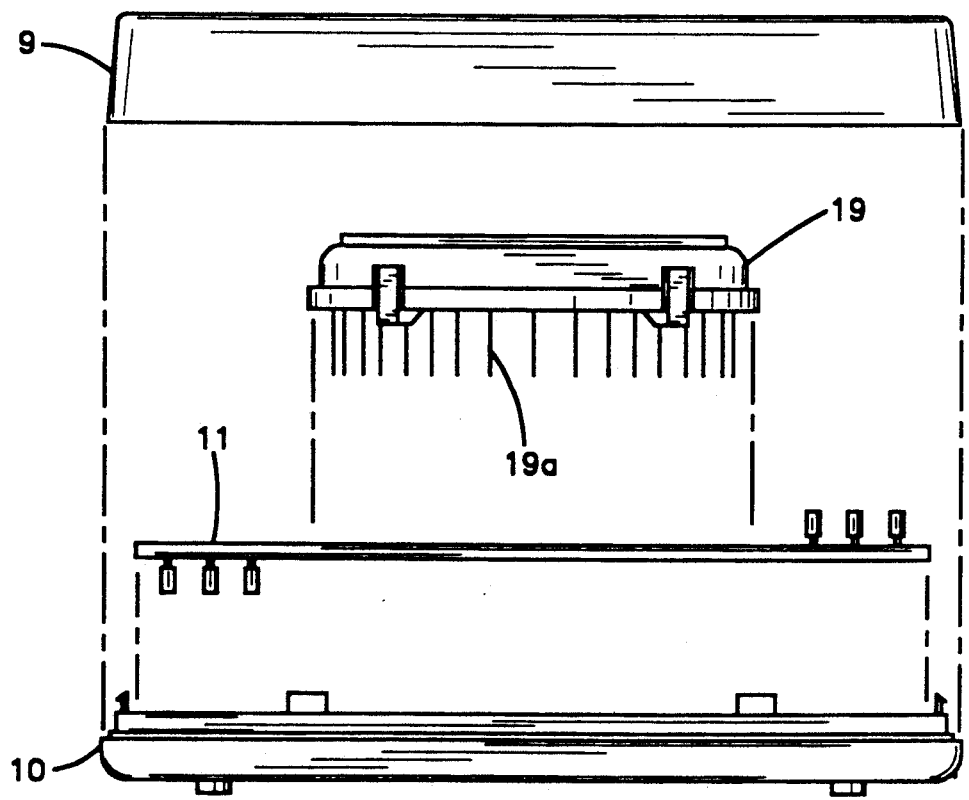
FIG. 2 is an exploded end view of the components of the electronic meter shown in FIG. 1.

As shown in FIG. 1, the multimeter 1 includes a cover 9 and a base 10 which cooperate to form an enclosure therebetween. The enclosure contains a primary or mother circuit board 11 (FIG. 2) having mounted thereto a plurality of electrical components 12 (schematically illustrated in FIG. 4) such as, for example, resistors, capacitors, integrated circuits and the like. The enclosure includes a display 13 partially extending through the cover 10, which is adapted to display the results of the particular engine test being conducted.

The electrical components 12 are in electrical contact with a series of primary input jacks 14 and auxiliary input jacks 15 on the front of the enclosure, as well as with a tachometer input jack 16 located on the side of the enclosure. As indicated generally at "A" in FIG. 4, the electrical components 12 are also in electrical contact with a trigger circuit 17, and a integrating circuit 18, both of which are also disposed on the primary or mother circuit board 11.

Again referring to FIG. 1, a multiple position rotary switch 19 partially extends through the cover 9 of the multimeter to form a switching function for the multimeter. The rotary switch 19 has a series of pins 19a (FIG. 2) extending downwardly therefrom, which are adapted to engage corresponding electrical contacts on the primary or mother circuit board 11. The switching function is adapted to allow the meter to test such engine characteristics as frequency, duty cycle, dwell angle (in degrees), engine speed (in revolutions per minute), resistance, and AC and DC voltages.

The rotary switch 19 of the switching function is rotated to a pre-selected position around the switch dial 21, depending on the particular engine characteristic being tested. The rotary switch 19 is in registering relationship with the electrical components on the primary or mother circuit board which appropriately detect, scale and display the information received through the input jacks, as described herein in more detail. A conventional multimeter rotary switch is shown in U.S. Pat. No. 4,876,416, owned by the assignee of the present invention, although other rotary switches may be used with the present invention.

To measure engine speed, the rotary switch 19 is typically set to a "tachometer" position on the dial 21.

A pickup, indicated generally at 20, is applied to a lead from one of the spark plugs in the engine, for example as shown in FIG. 3, and is adapted to inductively measure the current in the lead. As all the spark plugs have the same basic operating characteristics, any of the spark plug leads can be chosen to provide the multimeter with an accurate indication of engine speed.

Typically, the pickup has two arms 22, 23, each of which have a ferrite core disposed therein (not shown). The arm 22 has a coil of wire disposed around the ferrite core. The arms clamp around the outer insulated covering of the spark plug lead. The coiled wire in arm 22 is connected to pickup lead 25, which is in turn connected to the tachometer input jack 16 (FIGS. 1 and 4) of the multimeter. When the rotary switch is positioned at the "tachometer" position on the switch dial, the display 13 (FIG. 1) indicates the appropriate engine speed, in revolutions per minute, as described herein in more detail.

The multimeter displays the engine speed on display 13 by appropriately sensing the current in the spark plug lead, generating a certain duration pulse, storing the pulse on the integrating circuit, and scaling and displaying the integrated voltage as a value of engine speed. When a spark plug is ignited to initiate the power stroke of the piston, a current appears in the lead to the spark plug. The changing current in the spark plug lead creates a changing magnetic field. The changing magnetic field in turn creates a current spike in the inductive pickup 20, which is applied to tachometer input jack 16 (FIG. 1). If the current spike is above a certain threshold level, the trigger circuit 17 (FIG. 4), in contact with input jack 16, triggers a one-shot multivibrator in the multimeter and a selected duration voltage pulse is stored on the R-C integrating circuit 18 (FIG. 4). The voltage across the R-C integrating circuit 18 is scaled, measured and displayed on the meter as an appropriate tachometer reading.

As shown in detail in FIG. 5, the trigger circuit 17 includes resistors 31, 32, capacitors 33, 34 and silicon controlled rectifier (SCR) 39. SCR 39 is preferably manufactured by the Motorola Corp., Model No. MCR 100-7. The input from the tachometer input 16 is applied to the trigger circuit 17 through switch 2.

Switch 2 is a conventional sliding switch and has two switch components 3, 4 which simultaneously wipe across leads a-b and d-e, or b-c and e-f respectively, when the switch 2 is moved from a first position to a second position. For example, when switch 2 is in the first (or "four stroke" position), as shown in FIG. 5, component 4 is connected between leads b and c, and component 3 is connected between leads e and f. Alternatively, when switch 2 is in the second (or "DIS" position) (not shown), component 4 is connected between leads a and b, and component 3 is connected between leads d and e. Leads c and d are both free-floating, and consequently, when switch components 3, 4 are connected across them, the circuits are effectively "open" at that respective lead.

Accordingly, when switch 2 is in the four stroke position, as illustrated in FIG. 5, the input signal from the tachometer input 16 is applied across the end of a first resistor-capacitor pair 31, 33 and a second resistor-capacitor pair 32, 34. The signal is then applied to the gate of SCR 39. The cathode of SCR 39, as well as the other ends of the first and second resistor-capacitor pairs are tied to ground, as shown at 35.

When switch 2 is in the DIS position, the input signal through tachometer input jack 16 is only applied across the first resistor-capacitor pair 31, 33. In the DIS position, switch component 3 is connected between lead e and free-floating lead d, which accordingly opens the circuit and effectively removes the second resistor-capacitor pair 32, 34 from the circuit. The signal is then applied to the gate of SCR 39. The trigger level of SCR 39 is dependent upon the voltage and current levels in the circuit. Switch component 3 thereby regulates the trigger level of SCR 39 by regulating the resistance and capacitance in the circuit.

The output of trigger circuit 17 is applied to a buffer 40, which for example may be a two-input CMOS NOR gate. The CMOS NOR gate has both inputs connected to the output of SCR 39, as well as to power supply lead 41 through resistor 42 (4.7 K Ohms) and capacitor 43 (0.01 µf). The output of the buffer 40 provides a triggering pulse for a one-shot multivibrator circuit, illustrated generally at 44.

The one-shot multivibrator circuit 44 is conventional in design and includes capacitor 45 (0.047 µf), resistors 46, 47 (100 K Ohm each) and two gates 48, 49 which may for example, be two-input CMOS NOR gates. The one-shot multivibrator also includes capacitors 50, 51 (0.0015 µf each), and lead 52 connected to ground. Diode 56 protects the multivibrator circuit from voltage spikes exceeding the power supply level.

Capacitor 45 and resistors 46 and 47 determine the time constant for the one-shot multivibrator circuit. Resistor 46 is connected between the input to gate 49 and supply lead 41. Resistor 47 is similarly connected between the input to gate 49 and lead b of switch component 4. When switch component 4 is in the four stroke position illustrated, resistor 47 is connected to free-floating lead c, and consequently no current flows through the resistor. Alternatively, when switch component 4 is in the DIS position, resistor 47 is connected through lead b to lead a, and hence to supply lead 41. Accordingly, in the DIS stroke position, resistors 46, 47 are connected in parallel, which reduces in half the resistance between lead 41 and gate 49. Switch component 4 thereby regulates the time constant of the one-shot multivibrator circuit by regulating the resistance between the lead and the one-shot multivibrator circuit.

The output from the one-shot multivibrator circuit 44 is connected to the R-C integrating circuit 18. Circuit 18 comprises resistor 60 and capacitor 61 (10 µf). Preferably resistor 60 has a value of 100 K Ohms, while capacitor 61 has a value of 10 µf. The voltage across the integrating circuit 18 is scaled through variable resistor 62 (250 K Ohms) to provide an accurate indicating of the engine speed. The output of variable resistor 62 through lead 63 is applied to the electrical components in the multimeter, and subsequently to display 15. For example, if the voltage scaled with resistor 62 is 10.0 mV, the multimeter might display the value of 100. Indicia on the front cover of the multimeter would typically direct service personnel to multiply the displayed value by ten ($\times$10), for a resultant tachometer reading of 1000 RPM.

During operation of the engine, the spark plugs alternately fire to drive the pistons within their cylinders. A spark plug initially ignites the air/fuel mixture and causes the mixture to burn rapidly and drive a piston within a cylinder during the power stroke. In a two stroke or DIS four stroke engine, the spark plug fires each time the piston moves to the upper end of the cylinder. Alternatively, in a four stroke engine, the spark plugs fire once every two times the piston moves to the upper end of the cylinder.

The level of voltage applied to a spark plug to cause it to fire is a function of the dielectric strength in the spark plug gap. In a DIS four stroke engine, when the piston is under compression, the dielectric strength in the spark plug gap is high, and consequently a substantial voltage is required to ignite the spark plug, typically in the 15 K Volt range. However, when the piston is on the exhaust stroke, the dielectric strength across the spark plug gap is lower and the spark plug fires at a relatively low voltage, typically around 1.5 K Volt.

The current levels sensed in the spark plug leads during the power stroke and exhaust stroke, however, remain relatively constant. In a DIS four stroke engine, the electronic ignition provides for very controlled spark plug firing. Therefore, the current levels are relatively small. However, in a conventional four stroke engine, the current levels are relatively high. Moreover, the secondary current spikes in the spark plug leads in a conventional four stroke engine caused by "noise" from other cylinders are also higher.

Therefore, the trigger level for a conventional four stroke engine must be set at a relatively high level to reject the current spikes caused by "noise" in the leads. Alternatively, the trigger level for a DIS four stroke engine must be set at a relatively low level to trigger on the relatively smaller current spikes in the spark plug leads provided by the more efficient, and less "noisy" engine system. Consequently, the trigger level of the multimeter must be variable to compensate for both the conventional four stroke and DIS four stroke engines.

Accordingly, to compensate for the different engines characteristics, the selector switch 2 can be set to either the "four stroke" position or the "DIS" position. When the selector switch 2 is set to the DIS position when a DIS four stroke engine is being tested, only the first resistor-capacitor pair 31, 33 is present in the trigger circuit, which reduces the trigger threshold of SCR 39 and thereby triggers the multimeter when the smaller current spikes from the DIS four stroke engine are present in the spark plug lead. To achieve a preferred threshold level, resistor 31 is selected to have a value of 13 K Ohms and capacitor 33 is selected to have a value of 0.0022 µf.

Moreover, since the multimeter is actually measuring twice the value of the appropriate tachometer reading, the switch causes the multimeter to divide the tachometer value in half before it is displayed on the meter. Accordingly, both resistors 46 and 47 are connected in parallel to the supply lead 41, which in effect reduces by half the R-C time constant of the one-shot multivibrator, and hence the duration of the voltage pulse generated by the one-shot multivibrator circuit. Consequently, when the voltage across the R-C integrating circuit 18 is scaled, measured and displayed on the meter, the value displayed on the meter is one-half the normally displayed value.

Alternatively, when the switch is set to the four stroke position, such as when a conventional four stroke engine is being tested, the threshold level for the trigger in the meter is increased, such as for example, by adding the second capacitor-resistor pair 32, 34 in parallel with the first resistor-capacitor 31, 33 in the trigger circuit 17. Preferably, capacity 34 has a value of 0.01 µf and resistor 34 has a value of 470 Ohms. The SCR in the multimeter will then have a higher trigger threshold, and will be triggered only by the larger current spikes in the leads created by spark plug firing, and will reject any smaller spikes caused by "noise" on the spark plug leads.

Moreover, in the four stroke position, the lead b to resistor 47 is opened, and the one-shot multivibrator circuit therefore generates a voltage pulse of greater duration, which is then applied to the R-C integrating circuit. The meter then scales the voltage across the R-C integrating circuit, measures the value, and displays the value on the meter display.

Although the meter is primarily designed to provide for the rapid and accurate display of the engine parameters for either a DIS four stroke or a conventional four stroke engine, the meter will also display the proper engine speed for a two stroke engine when the selector switch is in the DIS position.

Consequently, the selector switch and associated circuitry provide the multimeter with an instantaneous and accurate indication of the proper tachometer value, regardless of whether the engine being tested is a DIS four stroke engine, a conventional four stroke engine or a two stroke engine. Therefore, the proper diagnostic display will be available to service personnel using a single meter, and by a method that is convenient, simple and accurate.

Although the invention has been shown and described with respect to a certain preferred embodiment, it is obvious that equivalent alterations and modifications will occur to others skilled in the art upon their reading and understanding of the specification. The present invention includes all such equivalent alterations and modifications, and is limited only by the scope of the following claims.

I claim:

1. An electrical meter for measuring the speed of an engine, comprising:
   means to sense the current level in a spark plug lead from the engine,
   means to apply a voltage pulse of a selected duration to an integrating circuit when said current level increases above a selected threshold level, and
   means to scale the voltage in said integrating circuit and display the scaled voltage on said electronic meter as a value of engine speed,
   said electronic meter including a switch means for lowering said threshold level when said switch means is in a first position, and for increasing said threshold level when said switch means is in a second position.

2. An electronic meter as in claim 1,
   wherein said means to apply a voltage pulse to the integrating circuit includes a trigger circuit.

3. An electronic meter as in claim 2, wherein said trigger circuit includes SCR means.

4. An electronic meter as in claim 3, wherein said trigger circuit includes at least one capacitor and one resistor for lowering the threshold level when said switch means is in said first position, and at least two capacitors and two resistors for increasing the threshold level when said switch means is in said second position.

5. An electronic meter as in claim 1, wherein said means to apply a voltage pulse of selected duration to an integrating circuit includes one-shot multivibrator means.

6. An electronic meter as in claim 5, wherein said one-shot multivibrator means includes resistor means.

7. An electronic meter as in claim 6, wherein said resistor means has a value of about X when said switch means is in the first position, and a value of about $\frac{1}{2} \times$ when said switch means in the second position, $\times$ being the value of at least one resistor in said resistor means.

8. An electronic meter as in claim 1, wherein said means to sense the current level in the spark plug lead includes a pickup adapted to be positioned around the spark plug lead.

9. An electronic meter for measuring engine speed, comprising:
   a pickup for sensing the current level in a spark plug lead in the engine,
   a trigger circuit having means for applying a voltage pulse to an integrating circuit when the current level in the spark plug lead increases above a preselected threshold level,
   means to scale the voltage across the integrating circuit and means to display the scaled voltage as a value of engine speed, and
   a selector switch having at least two positions, said selector switch having means to lower the threshold level when said selector switch is in a first position, and means to increase the threshold level when said selector switch is in a second position,
   said electronic meter displaying the correct value of engine speed for a DIS four stroke engine when said selector switch is in said first position, and displaying the correct value of engine speed for a conventional four stroke engine when said selector switch is in said second position.

10. An electronic meter for measuring the speed of an engine, comprising:
    a trigger circuit having means for receiving an input signal from a spark plug lead in the engine, and means for applying the signal to a one-shot multivibrator circuit when the signal increase above a selected threshold level,
    said one-shot multivibrator circuit having means for applying a voltage pulse to an integrating circuit when the signal is received from said trigger circuit,
    said integrating circuit having means for storing said voltage pulse and means to scale the voltage across the integrating circuit and display the scaled voltage as a value of engine speed, and
    said electronic meter including means for selecting the threshold level in said trigger circuit.

11. An electronic meter for measuring the speed of an engine as in claim 10, wherein said trigger circuit has means for applying said signal to a buffer means.

12. An as in claim 10, wherein said means for selecting the threshold level includes a two-position switch, wherein when the switch is in one position the threshold level is decreased, and when the switch is in the other position the threshold level is increased.

13. A method for measuring the speed of different types of engines, comprising the steps of:
    sensing the current level in a spark plug lead in the engine,
    selecting a threshold value of current depending on the type of engine being tested,
    applying a voltage pulse to an integrating circuit if the current level is above the selected threshold value, and
    scaling the voltage across the integrating circuit and displaying the scaled voltage as a value of engine speed.

* * * * *